United States Patent
Joffe et al.

(10) Patent No.: US 10,904,111 B2
(45) Date of Patent: *Jan. 26, 2021

(54) LIGHTWEIGHT FRAMEWORK WITH DYNAMIC SELF-ORGANIZING COORDINATION CAPABILITY FOR CLUSTERED APPLICATIONS

(71) Applicant: International Business Machines Corporation, Armonk, NY (US)

(72) Inventors: Anna Joffe, London (GB); Howard A. Kelsey, London (GB); Viktor Levine, London (GB); Michael P. W. Thornton, West Sussex (GB)

(73) Assignee: International Business Machines Corporation, Armonk, NY (US)

( * ) Notice: Subject to any disclaimer, the term of this patent is extended or adjusted under 35 U.S.C. 154(b) by 634 days.

This patent is subject to a terminal disclaimer.

(21) Appl. No.: 14/504,609

(22) Filed: Oct. 2, 2014

(65) Prior Publication Data

US 2016/0099825 A1    Apr. 7, 2016

(51) Int. Cl.
*H04L 12/26* (2006.01)
*H04L 29/08* (2006.01)

(52) U.S. Cl.
CPC .............. *H04L 43/04* (2013.01); *H04L 43/10* (2013.01); *H04L 67/10* (2013.01); *H04L 67/1002* (2013.01); *H04L 67/1014* (2013.01); *H04L 67/1025* (2013.01); *H04L 67/1061* (2013.01)

(58) Field of Classification Search
CPC ..... H04L 67/1002; H04L 67/10; H04L 43/10; H04L 43/04; H04L 67/1012; H04L 67/1014; H04L 67/1025; H04L 67/1061

USPC .......................................................... 709/201
See application file for complete search history.

(56) References Cited

U.S. PATENT DOCUMENTS

| | | |
|---|---|---|
| 7,464,147 B1 | 12/2008 | Fakhouri et al. |
| 7,930,339 B2 | 4/2011 | Tobita et al. |
| 8,296,434 B1 | 11/2012 | Miller et al. |
| 8,412,810 B1 | 4/2013 | Tompkins |
| 8,595,331 B2 | 11/2013 | Henseler et al. |
| 8,719,415 B1 | 5/2014 | Siorta et al. |
| 9,444,884 B2 * | 9/2016 | Newton ................ H04L 67/148 |

(Continued)

OTHER PUBLICATIONS

Application No. entitled "Lightweight Framework With Dynamic Self-Organizing Coordination Capability for Clustered Application" filed.

(Continued)

*Primary Examiner* — Emmanuel L Moise
*Assistant Examiner* — Xiang Yu
(74) *Attorney, Agent, or Firm* — Edward Li

(57) ABSTRACT

A method, a computer program product, and a computer system for a lightweight framework with dynamic self-organizing coordination capacity for clustered applications are provided. The lightweight framework provides a means for managing tasks that require coordination between application nodes. A node receives a task and determines whether one of other nodes is processing the task. The node runs as an active node to process the task, in response to determining that none of the other nodes is processing the task. The node runs as one of one or more passive nodes that monitor processing of the task, in response to determining that the one of the other node is processing the task.

3 Claims, 3 Drawing Sheets

(56) References Cited

U.S. PATENT DOCUMENTS

| | | |
|---|---|---|
| 9,934,272 B2 | 4/2018 | Braun |
| 10,176,147 B2 | 1/2019 | Samadi |
| 2011/0161961 A1* | 6/2011 | Fu .................. G06F 9/5027 |
| | | 718/102 |
| 2012/0131591 A1 | 5/2012 | Moorthi et al. |
| 2013/0152191 A1* | 6/2013 | Bright ............ H04L 63/0218 |
| | | 726/14 |
| 2013/0205162 A1* | 8/2013 | Hirose ............ G06F 11/2023 |
| | | 714/4.11 |
| 2014/0067851 A1 | 3/2014 | Asaad |
| 2014/0157038 A1 | 6/2014 | Ashok et al. |
| 2015/0128121 A1* | 5/2015 | Garcia ................... G06F 8/65 |
| | | 717/170 |
| 2016/0077936 A1* | 3/2016 | Tang ............... G06F 11/2028 |
| | | 714/4.11 |
| 2016/0099999 A1 | 4/2016 | Joffe |

OTHER PUBLICATIONS

Appendix P List of IBM Patents or Patent Applications Treated as Related.

Isard, Michael, et al.; "Quincy: Fair Scheduling for Distributed Computing Clusters"; Silicon Valley, Mountain View Califorinia.

Nadeem, M., et al.; "Task Scheduling Strategies for Dynamic Reconfigurable Processors in Distributed Systems"; The Netherlands; Copyright 2011 IEEE.

* cited by examiner

LIGHTWEIGHT FRAMEWORK WITH DYNAMIC SELF-ORGANIZING COORDINATION CAPABILITY FOR CLUSTERED APPLICATIONS

TECHNICAL FIELD OF THE INVENTION

The present invention relates generally to distributed computing systems and architectures, and more particularly to a lightweight framework with dynamic self-organizing coordination capacity for clustered applications.

BACKGROUND

Applications are increasingly moving to a clustered design, where any number of nodes may be active. These types of applications are also a natural fit for deployment on cloud infrastructure. In a cloud environment, application instances or nodes need an ability to join and leave processing cluster at unspecified time. This is non-critical for short-running tasks, such as serving users' requests, as the tasks are often covered by a transactional control which offers an ability to recover.

Inherently in most applications, it is a need to support highly parallel processing of requests. For these type of applications, the software should be designed so that there is as little coupling between nodes as possible, thus preventing bottlenecks from being introduced. However, these nodes normally will share some common application states, and therefore it is also likely that a subset of processing tasks, usually long-running ones, will need coordination among nodes. For example, the application uses a reference dataset that has to be updated periodically. In this scenario, some processing of data may need to happen, followed by a switchover to the new dataset. For such a long-running task, an effective way of minimizing data corruption is to perform it on a single node. The remaining nodes will receive notification when it is safe to switch over to the new version of the dataset.

There exist solutions which address this type of long-running tasks. One common approach is to designate a dedicated application node to fulfill this role. The dedicated application node may have a common codebase with the other application nodes or it may not. The dedicated application node is certainly configured differently from the other nodes, so it can perform the long-running tasks while the other nodes are running short user requests. A flaw in this solution is evidently a single point of failure in that node. It is possible to strengthen the configuration by providing a backup dedicated node, but the solution comes up against the task of synchronizing these dedicated nodes.

Another solution is to allow one or more of the homogeneous nodes to self-elect to become a dedicated node. These nodes are identical to other nodes in all other respects. The self-election mechanism is driven by some rules. This solution is different from the previous one in that all nodes start from identical configuration. The self-elected node becomes a coordinating node for the whole cluster. It may be backed up by other nodes to provide resilience. This approach has the deficiency that self election is semi-permanent, so the node in this role is only capable of performing these special long running tasks. Sometimes several of these nodes can perform these tasks simultaneously. Some synchronization will still be required between application nodes in this setup. This solution has a few flaws as follows. The dedicated node is tied up with special tasks. Multiple nodes are required to provide a degree of resilience. The dedicated nodes are not utilized for running ordinary short tasks; therefore, there is a high level of redundancy in the form of idle nodes which can otherwise be utilized.

SUMMARY

In one aspect, a method for a lightweight framework with dynamic self-organizing coordination capacity for clustered applications is provided. A node receives an event and determines whether one of other nodes is processing a task triggered by the event. In response to determining that none of the other nodes is processing the task, the node processes the task as an active node. In response to determining that the one of the other nodes is processing the task, the node runs as one of one or more passive nodes, wherein the one or more passive nodes monitor processing of the task.

In another aspect, a computer program product for a lightweight framework with dynamic self-organizing coordination capacity for clustered applications is provided. The computer program product comprising a computer readable storage medium having program code embodied therewith. The program code is executable for a node to: receive an event; determine whether one of other nodes is processing a task triggered by the event; process the task as an active node, in response to determining that none of the other nodes is processing the task; run as one of one or more passive nodes that monitor processing of the task, in response to determining that the one of the other nodes is processing the task.

In yet another aspect, a computer system for a lightweight framework with dynamic self-organizing coordination capacity for clustered applications is provided. The computer system comprises one or more processors, one or more computer readable tangible storage devices, and program instructions stored on at least one of the one or more computer readable tangible storage devices for execution by at least one of the one or more processors. The program instructions are executable for a node to receive an event. The program instructions are executable for the node to determine whether one of other nodes is processing a task triggered by the event. The program instructions are executable for the node to process the task as an active node, in response to determining that none of the other nodes is processing the task. The program instructions are executable for the node to run as one of one or more passive nodes that monitor processing of the task, in response to determining that the one of the other nodes is processing the task.

DETAILED DESCRIPTION

Embodiments of the present invention provide a lightweight framework with dynamic self-organizing coordination capacity for clustered applications. The lightweight framework which can be utilized by any networked service application which is capable or should be capable of being deployed in a clustered mode, for example a cloud application. The lightweight framework provides a means for managing tasks that require coordination between application nodes: a long-running task is being executed by a single node chosen dynamically using some rules. Remaining nodes will continue to serve short-lived tasks. There is internode communication established via the use of a publish-subscribe channel allowing the synchronization of these activities. Therefore, no coordinating node is necessary, and new nodes can be added to and removed from the cluster at will. Upon completion of a long-running task, the executing node becomes an ordinary node indistinguishable from the rest of the nodes. Several of these long-running tasks can be executed by different nodes simultaneously.

In this lightweight framework, there is no special assignment of a node or nodes to perform a task. Moreover, assuming a multithreaded platform, a single application node can perform ordinary short-lived tasks simultaneously with long running tasks. This provides a foundation for extreme resilience in the lightweight framework. As long as there is at least a single node, the functionality is complete, albeit potentially with a reduced performance.

Embodiments of the present invention are now described in detail with reference to the accompanying figures.

Figure 1:
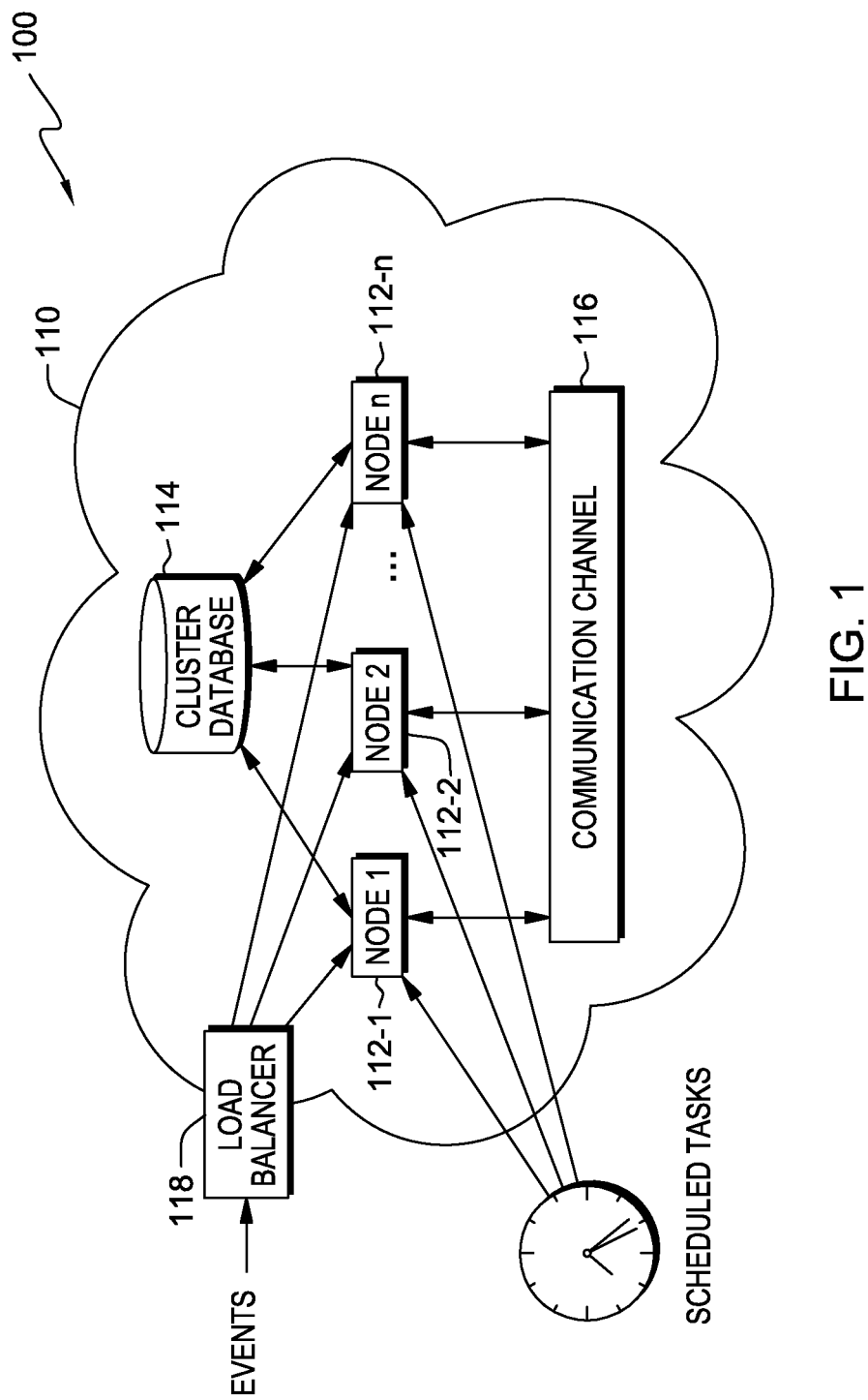
FIG. 1 is a diagram showing components in a system of clustered applications, in accordance with one embodiment of the present invention.

FIG. 1 is a diagram showing components in system 100 of clustered applications, in accordance with one embodiment of the present invention. System 100 includes application server cluster 110 (e.g., an application cluster) comprising a plurality of application nodes 112-1 through 112-n. An application node is an instance of an application deployed in application server cluster 110. Application nodes 112-1 through 112-n are running on modern hardware with inbuilt multithreading processors and on an operating system. Components of an application node will be discussed in later paragraphs with reference to FIG. 3. Application nodes 112-1 through 112-n have common resources, for example, data repository, cache, enterprise service bus etc. Each node can be located on a dedicated physical machine, but that is not mandatory.

Via load balancer 118, application nodes 112-1 through 112-n receive user events that are often requests to perform atomic operations and received either from a user or from a data stream channel. Usually the user events require quick responses. The user events trigger ordinary tasks which are main business tasks. The ordinary tasks are usually required to be completed in a short time, for example, tens of seconds at the most. For each user event received, a node starts an ordinary task. These are comparatively short processes and thus the user often awaits the outcome. Usually these ordinary tasks are part of a bigger business process. The task is naturally executed by the node in isolation from other nodes, unless there is a recursion where the node is a client to another node. But, that only confirms the isolation principle.

Via load balancer 118, application nodes 112-1 through 112-n also receive housekeeping events. The housekeeping events may come from an external source, for example, to trigger a reference data load. The housekeeping events may also be internally generated, such as periodic purging. The housekeeping events trigger housekeeping tasks. The housekeeping tasks are often long running complex tasks, which can take between several minutes and some hours to complete.

There are some internal application events, for instance scheduled tasks shown in FIG. 1. An application can emit an event itself and will warrant the housekeeping tasks processing. Obviously, it is not possible to synchronize these events between nodes. The safeguard is in place; therefore, if a housekeeping event arrives whilst a corresponding housekeeping task is in progress, it will be ignored. Obviously, the decision whether to process the same housekeeping task in parallel is configurable.

Each of application nodes 112-1 through 112-n has a rule engine which decides whether an event is a user event or a housekeeping event. The rule engine determines, for example, properties of the event, type of the event, and method of delivery (such as HTTP or JMS).

Application server cluster 110 further comprises communication channel 116. Communication channel 116 is used by application nodes 112-1 through 112-n to communicate with each other. A publish-subscribe paradigm should be supported by communication channel 116. Examples are JMS Topic (a distribution mechanism for publishing messages that are delivered to multiple subscribers) and MQTT (Message Queue Telemetry Transport, a publish-subscribe based "light weight" messaging protocol for use on top of the TCP/IP protocol), but there are other implementations as well. Application nodes 112-1 through 112-n use cluster notifications to communicate. The cluster notifications contain state information of the nodes.

Application server cluster 110 further comprises cluster database 114. Cluster database 114 is a repository of shared information relating to the state of processing of all housekeeping tasks. Cluster database 114 may be a RDBMS (relational database management system), a cache, a file-based storage, or a combination of these. Cluster database 114 may be used by the application logic as persistent storage.

In an embodiment of the lightweight framework with dynamic self-organizing coordination capacity for clustered applications, all nodes share a common cluster database. In the embodiment, there is a channel available to all nodes. In the embodiment, both user events and housekeeping events arrive to the nodes via a load balancing mechanism (load balancer) assuring that an event arrives only to a single node. A simple example of the load balancing mechanism is JMS Queue, where a message is assured to read only once and thus arrives only to a single listener. More complex solutions are available for JMS and other communication protocols. As far as a client is concerned, the whole agglomeration of nodes is a single application. In the embodiment, each node has a rule engine to discriminate between events, and all nodes run on a multithreaded platform. Also, in the embodiment, each node is stateless so that application data is stored in a common data repository.

Figure 2:
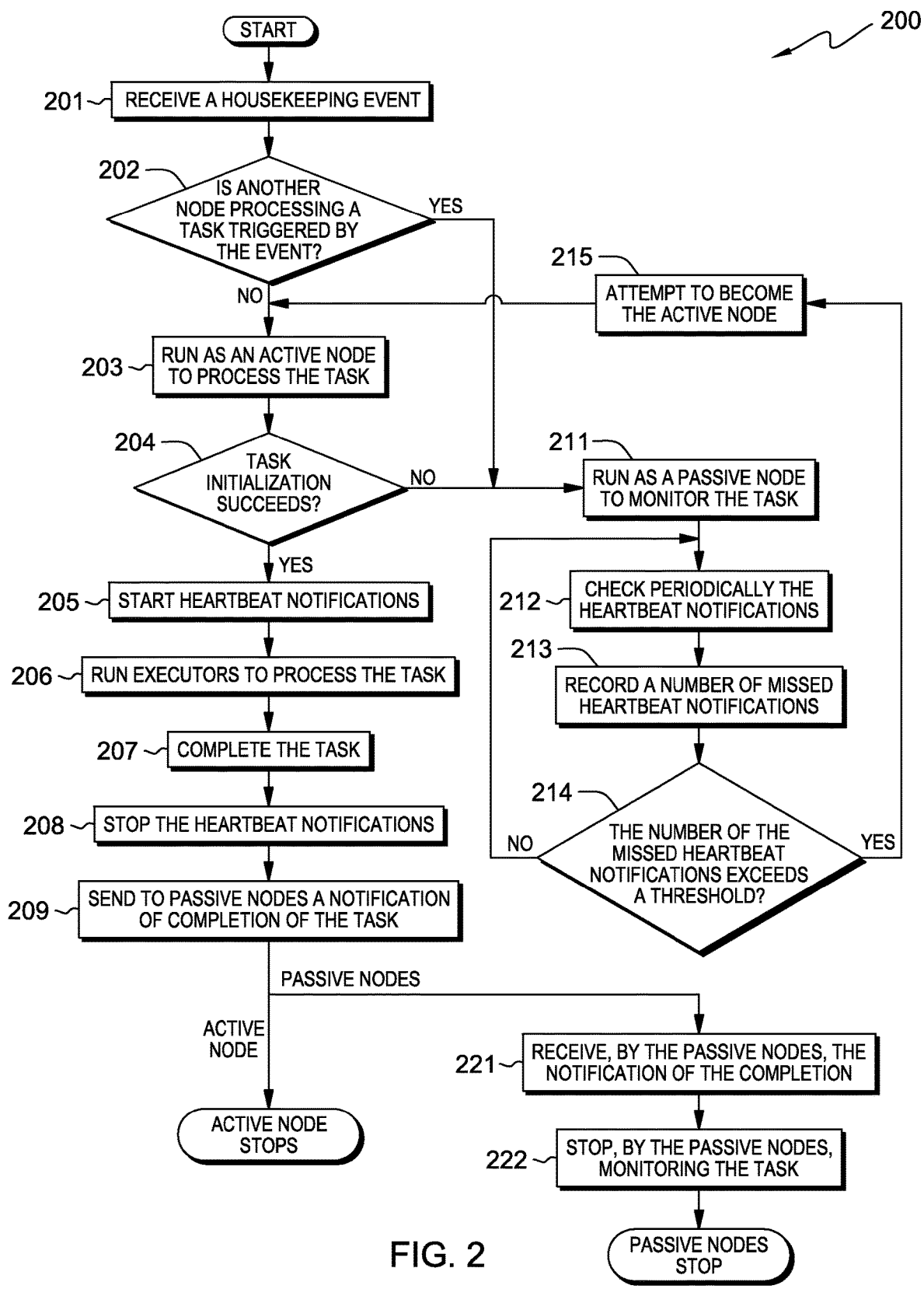
FIG. 2 is a flowchart showing operational steps of a lightweight framework with dynamic self-organizing coordination capacity for clustered applications, in accordance with one embodiment of the present invention.

FIG. 2 is flowchart 200 showing operational steps of a lightweight framework with dynamic self-organizing coordination capacity for clustered applications, in accordance with one embodiment of the present invention. At step 201, a node (one of application nodes 112-1 through 112-n) receives a housekeeping event. For each housekeeping event received, the node will attempt to start a housekeeping task. At decision step 202, the node determines whether another node is processing the housekeeping task.

In response to determining that no other node is processing the housekeeping task (NO branch of decision step 202), at step 203, the node runs as an active node to process the housekeeping task. The node creates a persistent record of the association between the housekeeping event and the node on cluster database 114 (shown in FIG. 1). In response to determining that another node is processing the housekeeping task (YES branch of decision step 202), at step 211, the node runs as a passive node to monitor the housekeeping task.

After step 203 (the node runs as the active node), at decision step 204, the node determines whether task initiation at step 203 succeeds. In response to determining that the task initiation fails (NO branch of decision step 204), the node executes step 211 (the node runs as the passive node). In response to determining that the task initiation succeeds (YES branch of decision step 204), the node (as the active node) at step 205 starts heartbeat notifications. The node (as the active node) emits periodic heartbeat notifications over communication channel 116 (shown in FIG. 1), indicating that the node is still alive as the active node and processing the housekeeping task. All other nodes are passive nodes in respect to the housekeeping event. The other nodes start monitoring the heartbeat notifications and detect a possible interruption of the heartbeat notifications. The interruption of the heartbeat notifications signifies a failure of the active node.

At step 206, the node (as the active node) runs executors to process the housekeeping task. At step 207, the node (as the active node) completes the housekeeping task. The node makes, on cluster database 114, a persistent record of completion of the housekeeping task. Then, at step 208, the node (as the active node) stops the heartbeat notifications. The node (as the active node) at step 209 sends to all the other nodes (acting as the passive nodes) a notification of completion of the housekeeping task.

At step 221, all the other nodes (acting as the passive nodes) receive the notification of completion sent by the active node at step 209. At step 222, all the other nodes (passive nodes) stop monitoring the housekeeping task.

While the node becomes the passive node at step 211, one of the other nodes will be the active node for this housekeeping task. Now, at step 212, the node (now as the passive node) checks periodically the heartbeat notifications sent from the active node. At step 213, the node (now as the passive node) records a number of missed heartbeat notifications. The missed heartbeat notifications from the active node signify a failure of the active node. The failure can be caused by a number of factors, for example, network failure, overload of the active node, and of course the utter failure of the active node. At decision step 214, the node (now as the passive node) determines whether the number of the missed heartbeat notifications exceeds a threshold.

In response to determining that the number of the missed heartbeat notifications does not exceed the threshold (NO branch of decision step 214), the node (now as the passive node) continues to monitor the heartbeat notifications and reiterates step 212. In response to determining that the number of the missed heartbeat notifications exceeds the threshold (YES branch of decision step 214), at step 215, the node (now as the passive node) attempts to become the active node. The threshold reflects a certain tolerance such that the node (currently as passive node) executes step 215 only after a certain predetermined number of the notifications have been missed. Step 215 is done via shared records on cluster database 114. If the node succeeds in marking the persistent record with its identifier, it will execute step 203, i.e., run as the active node to initiate to process the housekeeping task. Remaining nodes will assume a passive role as before.

Newly started nodes will receive heartbeat notifications of any housekeeping tasks in progress and start their own monitoring. One potential gap of restarting a housekeeping task after a take over is an inconsistency in a data model state, if a failed node has modified some of common data model (not shared in cluster database 114). A simple solution is to run a long transaction on the active node. A specific implementation may have a staged execution of a housekeeping task with safe points from which the task can continue after the take over. There is no 100% guarantee that the failed node will not come back to the task execution; for example, if a network connectivity has restored after a failure. It is possible to introduce a fail switch to notify a node that it should terminate the housekeeping task, if the node has been taken over by another node.

It is possible to scale and parallelize execution of a housekeeping task across all nodes with minor changes. For example, if a task can be broken into smaller units, then for each one of these units another event (housekeeping or user event) is emitted on a normal event queue (or any other channel over which events are arriving). An arbitrary node picks each event, executes the appropriate task and notifies the sender node of a completion. The originating node can complete processing of the overall housekeeping task once all smaller tasks have completed or, indeed, without waiting for them to complete.

An abstraction from that is a notion of the originating node sending multiple parallel requests for processing to a cloud of services and awaiting the responses of all of these requests. Once received, its own processing can commence. There is a possibility of a retry of a failed request, or if possible, implementation of compensating logic on remote servers.

Since the assumption is that all nodes are deployed on a platform supporting multithreading, any node can execute multiple ordinary tasks and housekeeping tasks simultaneously. So, in an extreme case, even a single node online can perform all functions. Similarly, as many nodes as desired can be running in parallel retaining the same functionality in respect to both these types of tasks.

Figure 3:
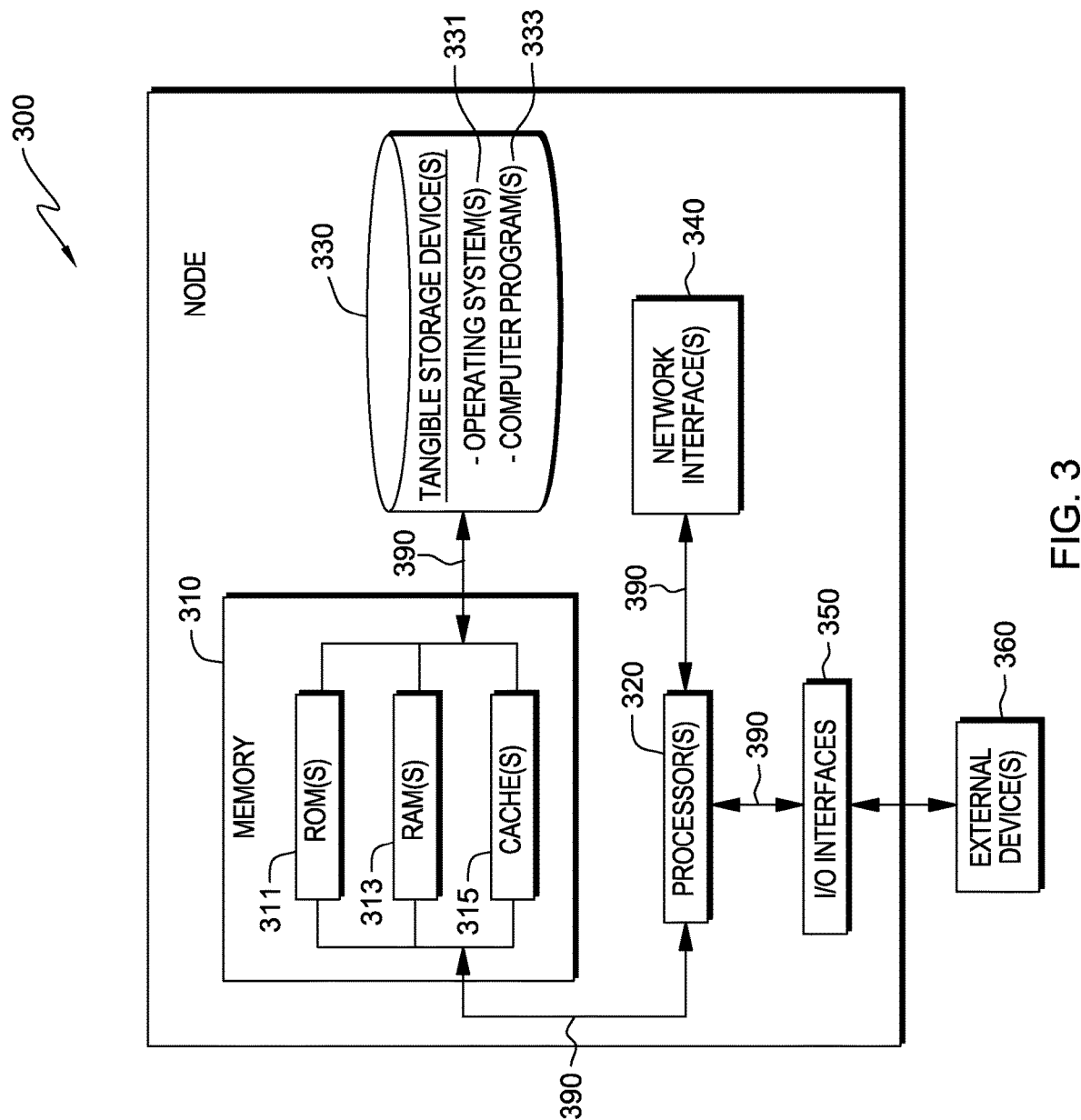
FIG. 3 is a diagram illustrating components of a node shown in FIG. 1, in accordance with one embodiment of the present invention.

FIG. 3 is a diagram illustrating components of a node shown in FIG. 1, in accordance with one embodiment of the present invention. It should be appreciated that FIG. 3 provides only an illustration of one implementation and does not imply any limitations with regard to the environment in which different embodiments may be implemented.

Referring to FIG. 3, node 300 includes processor(s) 320, memory 310, tangible storage device(s) 330, network interface(s) 340, and I/O (input/output) interface(s) 350. In FIG. 3, communications among the above-mentioned components of node 300 are denoted by numeral 390. Memory 310 includes ROM(s) (Read Only Memory) 311, RAM(s) (Random Access Memory) 313, and cache(s) 315. One or more operating systems 331 and one or more computer programs 333 reside on one or more computer readable tangible storage device(s) 330. Node 300 further includes I/O interface(s) 350. I/O interface(s) 350 allows for input and output of data with external device(s) 360 that may be connected to node 300. Node 300 further includes network interface(s) 340 for communications between node 300 and a computer network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device, such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN), and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, and conventional procedural programming languages, such as the "C" programming language, or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture, including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for a lightweight framework with dynamic self-organizing coordination capacity for clustered applications, the method comprising:

in response to determining that missing of periodic heartbeat notifications for a housekeeping task exceeds a predetermined threshold, determining, by a first node in an application server cluster, whether one of second nodes in the application server cluster is processing a housekeeping task triggered by a housekeeping event, wherein the housekeeping event is one of triggering a reference data load and periodical purging, wherein the housekeeping task is a long-running task;

in response to determining that none of the second nodes is processing the housekeeping task, processing, by the first node, the housekeeping task, the first node changing from a passive node for monitoring the housekeeping task to an active node for processing the housekeeping task, the second nodes running as one or more passive nodes for monitoring the housekeeping task, wherein the one or more passive nodes for monitoring the housekeeping tasks further process the ordinary tasks if there is any while not processing the housekeeping task, wherein the ordinary tasks are short-lived tasks and are triggered by user events, wherein the user events request to perform atomic operations;

creating on a database in the application server cluster, by the first node, a record of the housekeeping event, wherein the database is a repository of shared information relating to states of processing all housekeeping tasks and the database associates the housekeeping event with the first node and the second nodes;

determining, by the first node, whether the first node succeeds in initiation of the housekeeping task;

in response to determining that the first node succeeds in the initiation of the housekeeping task, emitting, by the first node, the periodic heartbeat notifications over a communication channel in the application server cluster, wherein the communication channel is used by the active node for the housekeeping task and the one or more passive nodes for the housekeeping task to communicate with each other, wherein the second nodes monitor processing of the housekeeping task when the first node runs as the active node for the housekeeping task;

running, by the first node, executors to process the housekeeping task;

stopping, by the first node, the periodic heartbeat notifications, in response to completing the housekeeping task;

creating on the database, by the first node, a record of completing the housekeeping event;

sending, by the first node, to the one or more passive nodes for the housekeeping task a notification of completion of the housekeeping task; and in response to determining that the one of the second nodes is processing the housekeeping task or in response to determining that the first node does not succeed in the initiation of the housekeeping task, running, by the first node, as one of the one or more passive nodes for the housekeeping task to monitor processing of the housekeeping task.

2. The method of claim 1, further comprising:

receiving from the active node for processing the housekeeping task, by the one or more passive nodes for monitoring the housekeeping task, the notification of the completion of the housekeeping task; and stopping, by the one or more passive nodes for monitoring the housekeeping task, the monitoring of the processing of the housekeeping task.

3. The method of claim 1, further comprising:

in response to that the first node runs as the one of the one or more passive nodes for monitoring the housekeeping task, checking, by the first node, the periodic heartbeat notifications sent from the one of the second nodes running as the active node for processing the housekeeping task;

recording, by the first node, a number of missed heartbeat notifications;

determining, by the first node, whether the number of the missed heartbeat notifications exceeds a predetermined threshold; and in response to determining that the number of the missed heartbeat notifications does not exceed the predetermined threshold, continuing, by the first node, to check the periodic heartbeat notifications.

\* \* \* \* \*